(12) United States Patent
Klug

(10) Patent No.: US 6,509,983 B1
(45) Date of Patent: Jan. 21, 2003

(54) SYSTEM AND METHOD FOR ADJUSTING RECORDING LASER BEAM POLARIZATION

(75) Inventor: Michael A. Klug, Austin, TX (US)

(73) Assignee: Zebra Imaging, Inc., Pflugerville, TX (US)

(*) Notice: Subject to any disclaimer, the term of this patent is extended or adjusted under 35 U.S.C. 154(b) by 0 days.

(21) Appl. No.: 09/782,125

(22) Filed: Feb. 13, 2001

(51) Int. Cl.[7] ............ G03H 1/00; G03H 1/04; G02F 1/03

(52) U.S. Cl. ............ 359/35; 359/1; 359/249; 359/30; 369/112.02

(58) Field of Search .............. 359/1, 10, 11, 359/35, 30, 249, 281; 369/112.02; 372/106

(56) References Cited

U.S. PATENT DOCUMENTS

| | | | | |
|---|---|---|---|---|
| 5,317,435 A | * | 5/1994 | Kasazumi et al. | 359/35 |
| 6,151,142 A | * | 11/2000 | Philips et al. | 359/3 |
| 6,181,728 B1 | * | 1/2001 | Cordingley et al. | 372/106 |
| 6,298,027 B1 | * | 10/2001 | Wilde et al. | 369/112.02 |

FOREIGN PATENT DOCUMENTS

JP          11-342640     * 12/1999     ......... H04N/1/113

OTHER PUBLICATIONS

T. J. Trout W. J. Gambogi, and S. H. Stevenson, "Photopolymer Materials for Color Holography," *Society of Photo-Optical Instrumentation Engineers*, Proc. SPIE, vol. 2577, 1995, pp. 94–105.

William J. Gambogi, Andrew M. Weber, and T. John Trout, "Advances and Applications of DuPont Holographic Photopolymers," *Society of Photo-Optical Instrumentation Engineers*, Proc. SPIE, vol. 2043, 1993, pp. 2–13.

T. John Trout, John J. Schmieg, William J. Gambogi, and Andrew M. Weber, "Optical Photopolymers: Design and Applications," *Advanced Materials*, vol. 10, No. 15, 1998, pp. 1219–1224.

* cited by examiner

*Primary Examiner*—Audrey Chang
(74) *Attorney, Agent, or Firm*—Campbell Stephenson Ascolese LLP; Marc R. Ascolese

(57) ABSTRACT

Systems and methods for adjusting the polarization of one or more recording laser beams can correct (in whole or in part) for the changes in the polarization of the recording laser beam(s) caused by changes in the dominant polarization direction within the film substrates used for recording holograms. Using information about the dominant polarization direction of portions of holographic film substrate, a polarization adjusting device can be used to adjust the polarization of the recording laser beam(s) to compensate for the effects that changes in the dominant polarization direction of the holographic film substrate have on the recording laser beam(s) and thus the recorded hologram.

20 Claims, 4 Drawing Sheets

SYSTEM AND METHOD FOR ADJUSTING RECORDING LASER BEAM POLARIZATION

BACKGROUND OF THE INVENTION

1. Field of the Invention

The present invention relates in general to the field of hologram production and, more particularly, to hologram production where a recording laser beam polarization is adjusted.

2. Description of the Related Art

One-step hologram (including holographic stereogram) production technology has been used to satisfactorily record holograms in holographic recording materials without the traditional step of creating preliminary holograms. Both computer image holograms and non-computer image holograms may be produced by such one-step technology. In some one-step systems, computer processed images of objects or computer models of objects allow the respective system to build a hologram from a number of contiguous, small, elemental pieces known as elemental holograms or hogels. To record each hogel on holographic recording material, an object beam is conditioned through the rendered image and interfered with by a reference beam. Examples of techniques for one-step hologram production can be found in the U.S. Patent Application entitled "Method and Apparatus for Recording One-Step, Full-Color, Full-Parallax, Holographic Stereograms," Ser. No. 09/098,581, naming Michael A. Klug, Mark E. Holzbach, and Alejandro J. Ferdman as inventors, and filed on Jun. 17, 1998, which is hereby incorporated by reference herein in its entirety.

In general, the holographic recording materials used in the fabrication of holograms include photopolymerizable compositions, dichromated gelatin, and silver halide emulsions. These holographic recording materials are typically placed on a glass or plastic substrate before being used in hologram production equipment (e.g., a "holographic printer"). Glass is a particularly useful substrate because of its good optical properties (e.g., high transmission, low distortion, low birefringence) and because of other beneficial mechanical properties including flatness, dimensional stability, scratch resistance, and chemical inertness.

FIG. 1A illustrates a typical holographic film 100 based on a holographic recording material layer 120 such as a photopolymerizable composition. Although a variety of different types of holographic recording material can be used with the techniques discussed herein, including photopolymerizable compositions, dichromated gelatin, and silver halide emulsions, holographic recording material layer 120 is preferably formed from a photopolymer. Photopolymers include a wide range of materials that undergo physical, chemical, or optical changes through selective polymerization when exposed to light. Changes in the photopolymer's refractive index, transparency, adhesion, and/or solubility differentiate light and dark regions when these materials are exposed to an activating light source. Photopolymers capable of recording volume phase holograms include those developed by Canon Incorporated (based on polyvinyl carbazole), Polaroid Corporation (based on polyethylene amine/acrylate), and E. I. du Pont de Nemours and Company (based on polyvinyl acetate and polymethyl methacrylate). Those having ordinary skill in the art will readily recognize that a variety of different photopolymer compositions can be used in the practice of the inventions described herein. Nevertheless, preferred photopolymer films are provided by E. I. du Pont de Nemours and Company under the trade designations, for example, OmniDex™ 706, OmniDex™ 801, HRF-800X001-15, HRF-750X, HRF-700X, HRF-600X, and the like.

FIG. 1A illustrates a typical photopolymer holographic film 100 as it is delivered from the film's manufacturer. Holographic film 100 includes a holographic recording material layer 120, a base sheet 110, and a cover sheet 130. Base sheet 110 and cover sheet 130 provide protection to holographic recording material layer 120, as well as dimensional stability to assist in the handling of the holographic film. Because of its protective and/or dimensional stability functions, base sheet 110 (and/or cover sheet 130) can be referred to as a "film substrate." As will be seen below, this film substrate is distinct from substrate 140 as shown in FIG. 1C. Base sheet 110 and cover sheet 130 are typically formed from polymer films, such as polyethylene, polypropylene, cellulose, polyvinyl chloride (PVC), and polyethylene terephthalate (PET). Although not shown, holographic film 100 can include additional layers, such as a barrier layer used, for example, to prevent interlayer diffusion of sensitizing dyes, and to provide protection from oxygen during exposure.

In preparation for placement of the holographic recording material layer 120 on a substrate, cover sheet 130 is removed from holographic film 100 as shown in FIG. 1B. The remaining portions of holographic film 100 (i.e., a holographic recording material layer 120, and a base sheet 110) are then placed on glass or plastic substrate 140, as illustrated in FIG. 1C. The natural tackiness of recording material layer 120 usually is sufficient to bind recording material layer 120 to substrate 140. Because at least some of the light used to record a hologram in holographic recording material layer 120 typically passes through base sheet 110, base sheet 110 preferably has good optical and material qualities including, for example, low scatter, flatness, low or no birefringence, mar-resistance, strength, and suitable thickness.

However, typical steps in the manufacturing process (and variations in the manufacturing process generally) for materials used for base sheet 110 can lead to at least one undesirable optical property, changes in birefringence from one portion of the material to another. For example, in the manufacturing of PET (e.g. Mylar® from E. I. du Pont de Nemours and Company) a common material used for base sheet 110, molten PET is extruded onto a chill roll drum to form the initial film. The film is first stretched in the direction of the extruded film path (i.e., the "machine direction" or the "down-web direction") using a series of rollers running at increasingly faster speeds. The film is then stretched in a transverse direction using, for example, a tenter, that pulls the film at right angles to the machine direction. Stretching rearranges the PET molecules into an orderly structure in order to improve the film's mechanical properties. Nevertheless, minor variations in this process, or the operation of the equipment used in this process, can lead to variation of the orientation of the film's molecules, which in turn can cause changes in birefringence from one portion of the film to another.

The birefringence of base sheet 110 affects the quality of polarized light (e.g., the polarized laser light from a reference or object beam) used in holographic recording. In general, birefringent materials have different indices of refraction for different directions of light transmitted therethrough. Materials typically used for base sheet 110, such as PET) can be classified as uniaxial or biaxial materials. Uniaxial films usually have two indices of refraction, one in the direction of stretch and the other which is generally perpendicular to the stretched direction. Biaxial materials typically have three indices of refraction: one in the direction of stretch or linear extent of the film material and generally in the plane of the material; a second perpendicular to the first and also in the generally in the plane of the material; and a third index of refraction looking through the material at an edge view of it. In these materials there are one or more axes along which there is no change in the index of refraction exhibited by the material. Those axes typically are referred to as the optical axes or optic axes, and generally define at least one dominant polarization direction.

If the polarization of the laser light transmitted through the film substrate is aligned with the dominant polarization direction of the film substrate, the modulation depth of the recorded hologram is maximized. Correct alignment between the recording beams and the film substrate allows for efficient holographic recording; a minimum amount of light is absorbed or reflected by the film substrate, allowing maximum coherent light exposure for the holographic recording.

FIG. 2 illustrates the process of recording interference patterns in the holographic recording material layer 120. To accomplish this task, any number of different recording apparatus and techniques can be used, such as the apparatus and techniques for one-step hologram production found in the aforementioned U.S. patent application Ser. No. 09/098, 581. The disclosure of U.S. patent application Ser. No. 09/098,581 is merely illustrative, and those having ordinary skill in the art will readily recognize that a variety of different schemes can be used to produce holograms. Reference beam 200 and object beam 210 are coherent light beams typically formed from the same original coherent light source (i.e., a laser whose output beam is split into two separate beams), and typically having the same polarization. The interference pattern created by the interference of reference beam 200 and object bean 210 is recorded in holographic recording material layer 120. Previously recorded holographic elements (hogels) 220 demonstrate that holographic elements are recorded in discrete locations within holographic recording material layer 120, with the substrate 140 (or beams 200 and 210) being repositioned after each recording step so that multiple holographic elements are recorded throughout holographic recording material layer 120. In the example shown, glass or plastic substrate 140 is adjusted in the direction of indexing direction 230 in order to record respective holographic elements.

If the dominant polarization direction of base sheet 110 is relatively constant, the recording laser beam polarizations can be aligned in a specific direction allowing for efficient holographic recording. However and as noted above, changes in the dominant polarization direction of the base sheet do occur, and those changes can be substantially systematic and predictable, or relatively random and unpredictable. For example, the dominant polarization direction across the transverse direction base sheet 110 can vary by 20° or more. The changes in the dominant polarization direction of the base sheet lead to unevenness in the holographic recording (leading to an image defect) that becomes particularly noticeable with large-scale and full-color holographic images.

Accordingly, it is desirable to overcome the adverse effects caused by changes in the dominant polarization direction within the film substrates used for recording holograms.

SUMMARY OF THE INVENTION

It has been discovered that systems and methods for adjusting the polarization of one or more recording laser beams can correct (in whole or in part) for the changes in the polarization of the recording laser beam(s) caused by changes in the dominant polarization direction within the film substrates used for recording holograms. Using information about the dominant polarization direction of portions of holographic film substrate, a polarization adjusting device can be used to adjust the polarization of the recording laser beam(s) to compensate for the effects that changes in the dominant polarization direction of the holographic film substrate have on the recording laser beam(s) and thus the recorded hologram.

Accordingly, one aspect of the present invention provides a system for adjusting the polarization of a recording laser beam. The system includes a polarization adjusting device and a controller coupled to the polarization adjusting device. The controller is operable to control the polarization adjusting device according to information about a dominant polarization direction of a first portion of a holographic film substrate.

Another aspect of the invention provides a method. A first portion of a holographic film substrate is measured to determine information about a dominant polarization direction of the first portion of the holographic film substrate. The polarization of a recording laser beam is adjusted based on the information about a dominant polarization direction of the first portion of the holographic film substrate.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following sets forth a detailed description of the best contemplated mode for carrying out the invention. The description is intended to be illustrative of the invention and should not be taken to be limiting.

Figure 3:
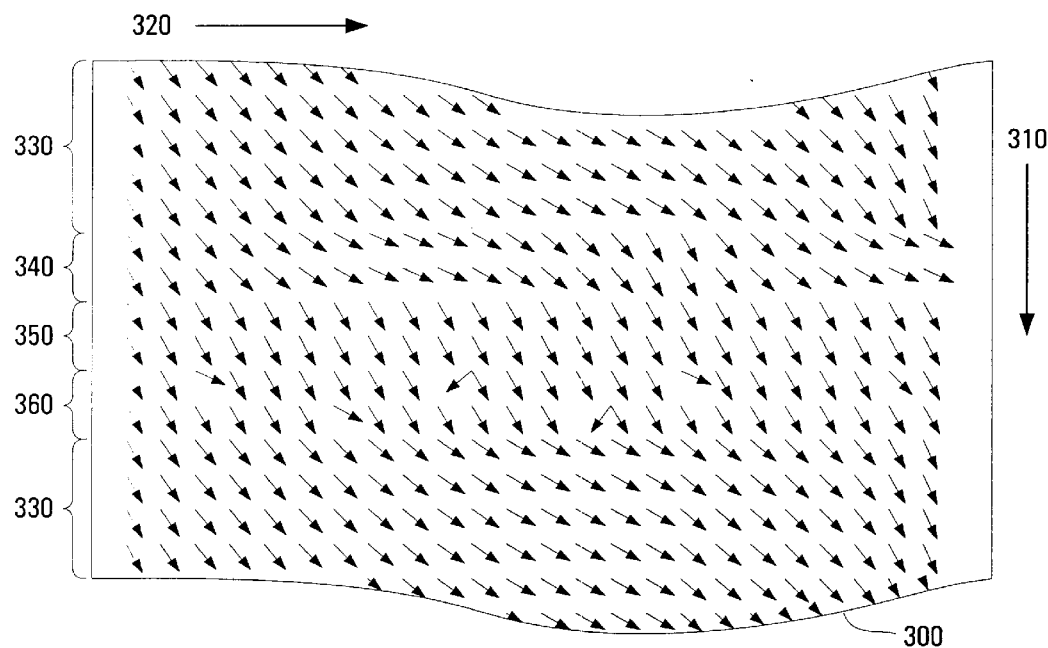
FIG. 3 illustrates variation in the dominant polarization direction of different portions of a holographic film substrate.

FIG. 3 illustrates variation in the dominant polarization direction of different portions of a holographic film substrate 300. Each of the arrows illustrate the dominant polarization direction for a given portion of holographic film substrate 300. It should be noted that the arrows are not necessarily intended to demonstrate that a particular portion of holographic film substrate 300 has a constant dominant polarization direction for that portion, or that a relevant portion of holographic film substrate 300 be of a particular size. Variations in dominant polarization direction can occur over very small or very large holographic film substrate areas. Each of the arrows shown in FIG. 3 provide information about a dominant polarization direction for an area determined by the analysis of holographic film substrate 300. For example, polarization measurements might be taken at one centimeter intervals in either the machine direction 310 or the transverse direction 320 across holographic film substrate 300. However, the interval chosen for measurement can be any interval appropriate for the holographic recording to be made on the holographic film. For example, if a holographic film including holographic film substrate 300 is to be used in a printer such as those described in the aforementioned U.S. patent application Ser. No. 09/098,581, the polarization measurement interval can be selected to coincide with the elemental hologram size for that printer.

Arrows 330 illustrate one of the more common examples of changes in dominant polarization direction across holographic film substrate 300. In this example, the changes are primarily in the transverse direction 320, with little or no change in dominant polarization direction in the machine direction 310. Generally speaking, the changes in dominant polarization direction illustrated by arrows 330 evidence systematic and predictable changes. If these are the only significant changes in dominant polarization direction, then only a small amount of information is needed, and recording laser beam adjustment can be made the same way for each series of holograms recorded across the width of holographic film including holographic film substrate 300. However, arrows 340 demonstrate that changes can occur in both machine direction 310 and transverse direction 320. As illustrated by arrows 350 demonstrate, some or all of holographic film substrate 300 can exhibit substantially the same dominant polarization direction in both machine direction 310 and transverse direction 320. Arrows 360 demonstrate that there can be apparently random localized changes in the dominant polarization direction. Whatever the nature of the changes in the dominant polarization direction of holographic film substrate 300, information about those changes is needed to adjust the polarization of one or more of the recording laser beams used in hologram production.

Figure 4A:
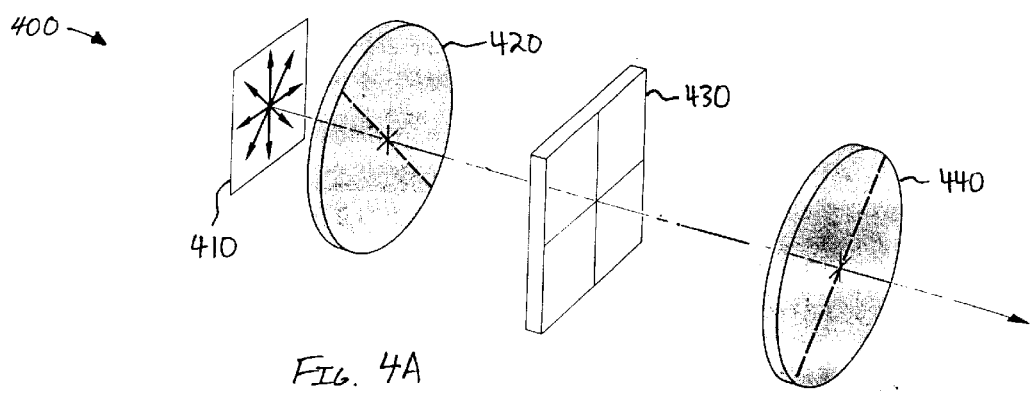
FIGS. 4A–4B illustrate two techniques for determining the dominant polarization direction of different portions of a holographic film substrate.
Figure 4B:
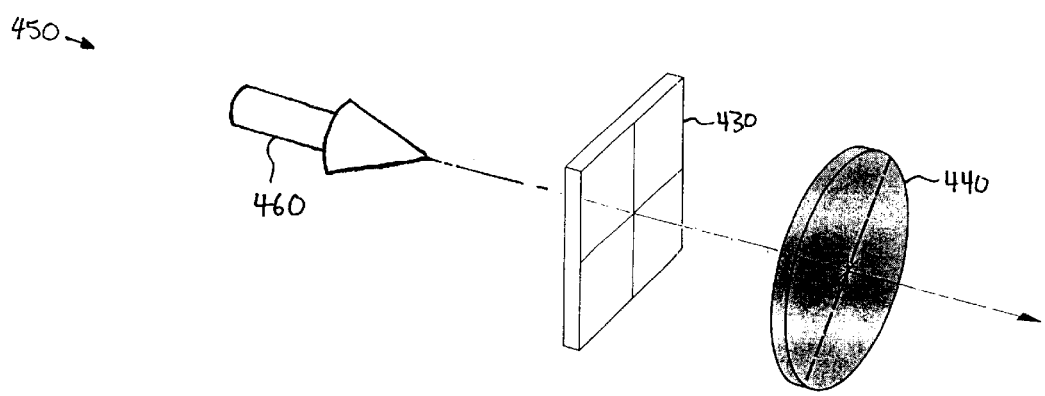

FIGS. 4A–4B illustrate two examples of techniques for determining the dominant polarization direction of different portions of a holographic film substrate. In FIG. 4A, film substrate analyzing system 400 uses unpolarized light from light source 410, for example a white-light box, which is then polarized by linear polarizer 420. The linearly polarized light then passes through holographic film substrate 430, which can be a sample of the film substrate typically used as part of a holographic film (such as holographic film 100) or a sample of holographic film that includes holographic film substrate 430. The polarization state of light emerging from linear polarizer 420 is further manipulated by holographic film substrate 430 based on the substrate's dominant polarization direction. Light emerging from holographic film substrate 430 passes through analyzer 440 (typically a linear polarizer oriented 90° with respect to linear polarizer 420). The light emerging from analyzer 440 is then measured directly (e.g., using a photodetector) or indirectly (e.g., by eyesight) as holographic film substrate 430 is rotated with respect to the cross-polarizers 420 and 440. Measuring the angle of rotation of holographic film substrate 430 with respect to cross-polarizers 420 and 440 when the light emerging from analyzer 440 is either maximized or minimized can determine the dominant polarization direction of the portion of holographic film substrate 430 being analyzed.

In FIG. 4B, film substrate analyzing system 450 uses a polarized light source 460 (e.g., a laser) in place of unpolarized light source 410 and polarizer 420. The polarization state of light from polarized light source 460 is further manipulated by holographic film substrate 430 based on the substrate's dominant polarization direction. Light emerging from holographic film substrate 430 passes through analyzer 440, and the dominant polarization direction of the portion of holographic film substrate 430 being analyzed is determined as outlined above.

The process for determining dominant polarization direction of each relevant portion of holographic film substrate 430 is repeated as necessary in order to have sufficient information for the entire holographic film substrate. Because the techniques described above use light, they can be considered "destructive" when used to measure holographic film substrates that are already part of a holographic film. Specifically, the light passing through the film substrate (e.g., base sheet 110 of holographic film 100) necessarily passes through the recording material layer (e.g., layer 120) thereby exposing the film. Once the film has been exposed, it is usually unsuitable for subsequent hologram recording. Thus, when destructive analysis techniques are used with holographic film, they are typically used with representative samples of holographic film. Such techniques are particularly useful where the variation in dominant polarization direction of the film substrate is systematic and predictable.

Nondestructive analysis techniques can also be used to provide adequate information about changes in the dominant polarization direction of the film substrate. For example, if the techniques illustrated in FIGS. 4A and 4B are used with light sources of sufficiently low intensity, the degree to which they expose an adjacent recording material layer can be minimized, and the holographic film can subsequently be used for hologram recording. Similarly, the techniques illustrated in FIGS. 4A and 4B can be used with light sources having wavelengths that will not expose the recording material layer (e.g., infrared wavelengths). However, using light sources with wavelengths different from those typically used to expose the recording material layer might require some additional information about the relationship between the birefringence of the film substrate at different wavelengths. Such information can be determined, for example, by calibrating the adjustments made due to birefringence to a source with a different wavelength. Alternately, the birefringence analysis can be performed by the film substrate's manufacturer, and/or by the holographic film manufacturer before the holographic recording material layer is applied to the film substrate.

Since the birefringent properties of the film substrate are, in general, wavelength dependent, it is preferable to determine the dominant polarization directions using light sources having the same or similar wavelengths as the light sources used as hologram recording laser beams. This is particularly important for holograms recorded using several different colored recording laser beams, such as the full-color holograms described in the aforementioned U.S. patent application Ser. No. 09/098,581.

Figure 5:
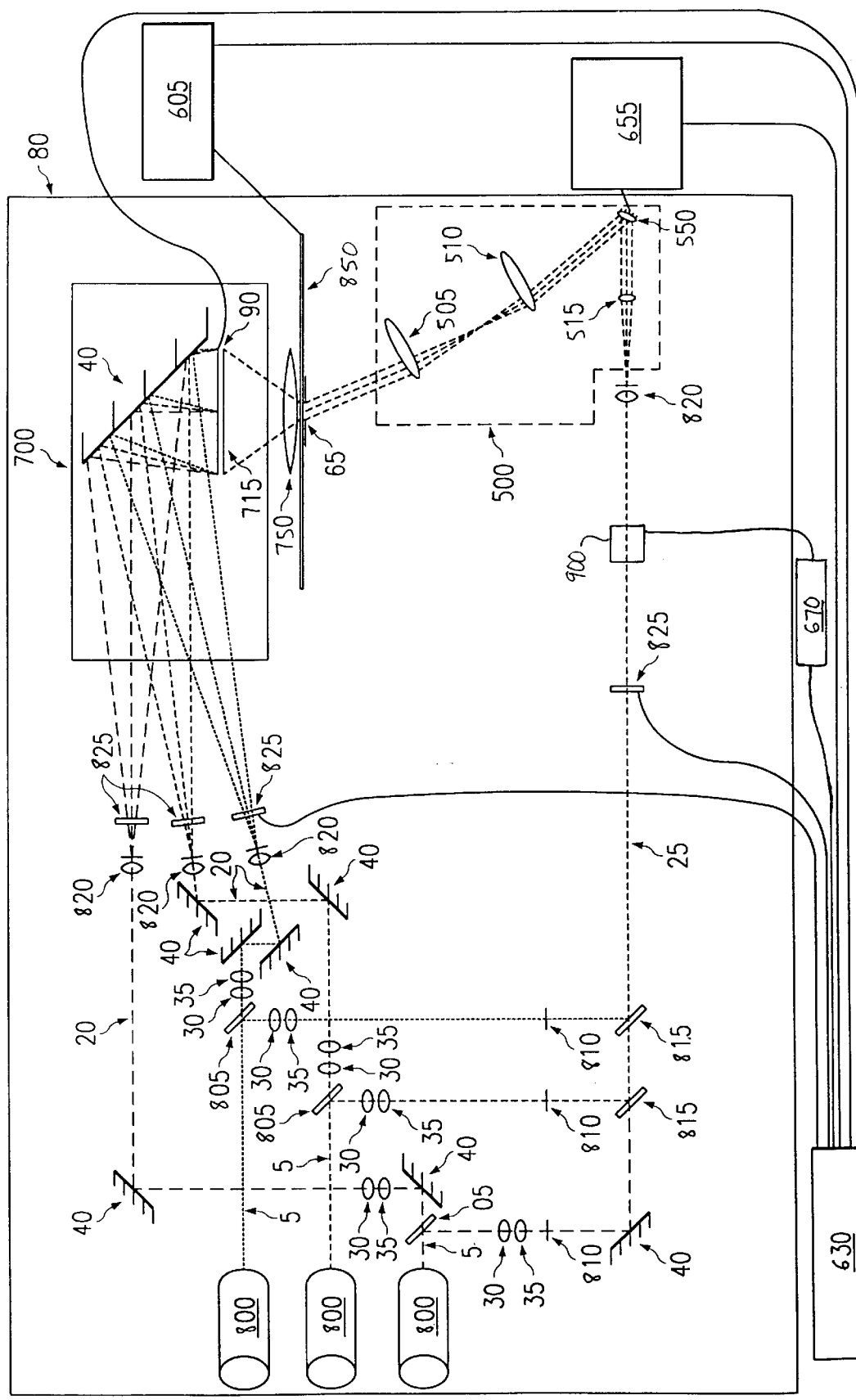
FIG. 5 is a top-view, schematic drawing of a one-step, full-color, full-parallax printer for holographic stereograms, including an embodiment of the present invention.

The information about the dominant polarization direction of different portions of a film substrate is used to adjust the polarization of one or more recording laser 30 beams used to record a hologram. FIG. 5 is a top-view, schematic drawing of a one-step, full-color, full-parallax printer for holographic stereograms, including a recording laser beam polarization adjustment system use to compensate for the birefringence of holographic film substrate material. As depicted in FIG. 5, most of the parts of the printer, except for a computer 630 and controllers 605 and 655, are isolated from vibrations by, for example, being supported on vibration isolation table 80. Table 80 can be composed of steel with a honeycomb interior, while the legs of table 80 typically include air pistons which can absorb vibrations. Other types of vibration isolation may also be acceptable.

In some embodiments, computer 630 and controllers 605 and 655 can be supported on table 80. Computer 630 typically has various input/output ports and/or busses through which computer 630 can control devices, like motor controllers, or through which the computer 630 can send output, such as images. Additionally, computer 630 may have computational power and speed sufficient for rendering the three-dimensional computer graphics used by the printer. Computer 630 typically includes one or more central processing units and a variety of different types of storage media, in which rendered images are stored.

In some embodiments. lasers 800 are not supported by table 80, although they are typically supported by some form of vibration isolation device. Lasers 800 can be lasers of three different colors. For example, one laser 800 may be a krypton ion or a helium neon (HeNe) laser for producing a red beam of light, another laser 800 can be an argon ion or a YAG laser for produce a green beam of light, and a third laser 800 can be an argon ion or a helium cadmium (HeCd) laser for producing a blue beam of light. Other light wavelengths are also acceptable, depending upon the application. In addition, lasers 800 may be solid state diodes or any other suitable type of lasers. As illustrated, the beams of light from the lasers 800 can pass through open air. However, in other embodiments, the beams of light from the lasers 800 may be transmitted through pipes in order to reduce instabilities due to air currents. Additionally, the beams can be transmitted through polarization-preserving, optical fibers.

In FIG. 5, the coherent light beams 5 produced by the lasers 800 are directed at variable beam splitters 805. Variable beam splitters are half-mirrors that split a beam by reflecting part of the beam and transmitting most of the rest of the beam. If fiber optics are used to transmit beams, then fiber optic beam splitters that work by contacting two parallel fibers together and letting the light from the fibers couple may be used. The coherent light beam 5 from each of the lasers 800 is split into two beams, an object beam 20 and a reference beam 25. In some embodiments, each object beam 20 and each reference beam 25 is directed through half-wave plates 30 and polarizers 35 in order to control the polarization of the beams. In other embodiments where polarization-retaining optical fibers are used to transmit a beam, the fibers can be rotatable about their center axes in order to adjust polarization (with respect to other optical components of the printer) of the beams being transmitted.

If needed, each object beam can be reflected off one or more mirrors 40. Mirrors 40 can be, for example, first surface, or front surface mirrors. Each object beam 20 can also be directed through a low pass spatial filter 820 to remove unwanted noise. Low pass spatial filter 820 can include a microscope objective lens and a pinhole. Each object beam 20 may also pass through a beam shutter 825. In one embodiment, the beam shutters 225 are high-speed, mechanical iris shutters, for example, those used in made the photography industry. In other embodiments, beam shutters 825 can be electro-optical systems such as liquid crystal cells or acousto-optical modulator crystals. In still another embodiment, instead of using separate beam shutters 825, the spatial light modulator (SLM) 90 in object beam unit 700 can function as a shutter for all three object beams. The shutters 825 are controlled by, for example, computer 630.

Object beams 20 are directed through object beam unit 700. In object beam unit 700, the object beams 20 are directed such that the object beams 20 converge at the plane of a SLM 90. SLM 90 may include, but is not limited to, a transmissive LCD panel, a reflective LCD panel, an optically addressed LCD panel, a digital micro-mirror array, film, a projection or a transparency. SLM 90 typically receives image input by a video cable from the computer 630. In addition, multiple SLMs may receive images generated in parallel by multiple central processing units. Moreover, multiple SLMs may receive images from storage devices of computer 630. After passing through SLM 90, object beam 20 can pass through a holographic optical element (HOE) 715 that is designed to converge the object beam and evenly expose the holographic film over an area the size of an elemental hologram. In one implementation, HOE 715 may be a transmission-type hologram that can converge three different monochromatic object beams at slightly different angles onto the elemental holograms to be exposed without allowing zeroth-ordered light from any of the object beams to intersect the elemental holograms to be exposed.

Figure 1A:
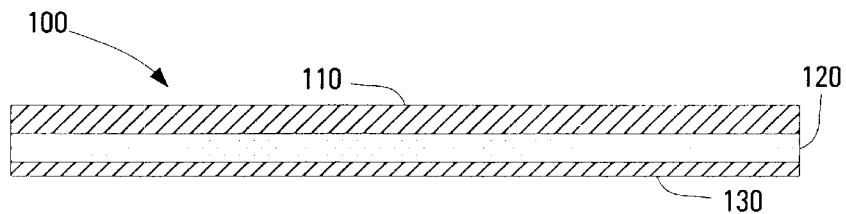
FIGS. 1A–1C illustrate a typical photopolymer holographic film and several steps in preparing the holographic film for exposure to an interference pattern.
Figure 1B:
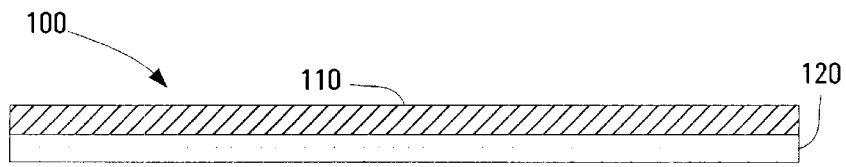
Figure 1C:
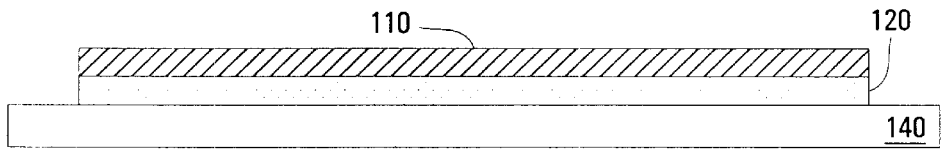
Figure 2:
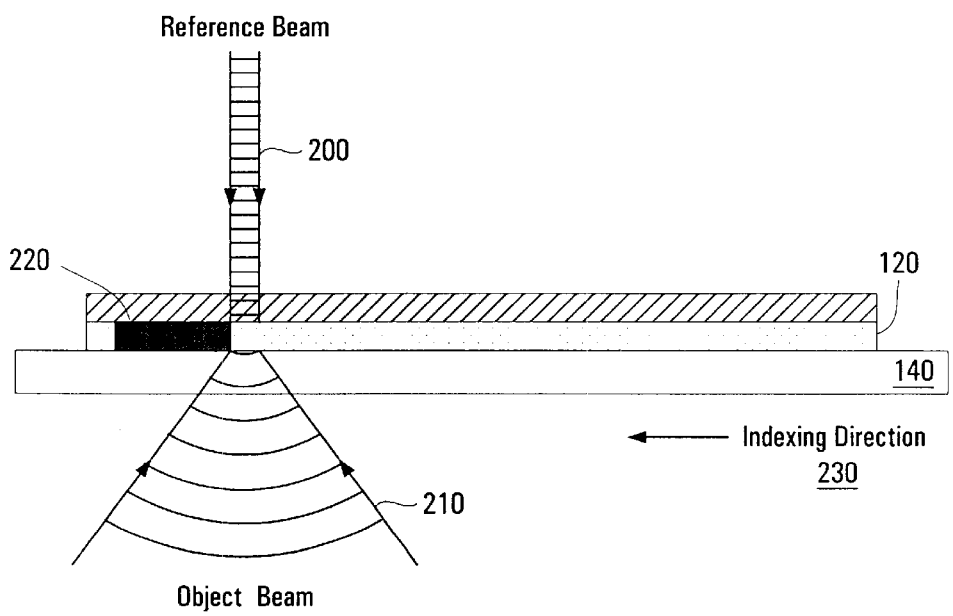
FIG. 2 illustrates the process of exposing the holographic recording material to an interference pattern, thereby generating a hologram.

After passing through object beam unit 700, object beam 20 is then transmitted through a voxel control lens 750 and can then expose an elemental hologram (e.g., 220 in FIG. 2) on a holographic recording material (e.g., 120 in FIG. 2) in a material holder 850. The holographic recording material is held securely by material holder 850 and can be translated in multiple directions. Movement of the material holder 850 can be controlled by film holder motor controller 605 which may, in turn, be controlled by computer 630.

As further depicted in FIG. 5, after the beams are split into object beam 20 and reference beams 25 by the variable beam splitters 805, each of the reference beams 25 passes through a variable attenuator 810 which allows the intensity of each reference beam 25 to be independently adjusted. The reference beams can be reflected off of a mirror 40 before passing through dichroic combiners 815 or other suitable optical combiners. A dichroic combiner is a wavelength selective mirror which reflects some wavelengths, but is transparent at other wavelengths. Dichroic combiners 815 combine the three reference beams 25 into one beam which may then pass through beam shutter 825 before passing through a low pass spatial filter 820. The reference beam 25 then passes through a reference beam steering system 500 which controls the angle reference beam 25 intersects with the holographic recording material. A beam-steering mirror system of the reference beam-steering system is controlled by mirror system motor controller 655 which, in turn, is controlled by computer 630. Furthermore, separate elemental holograms can be printed in different colors. For instance, by placing a beam shutter in the path of each object beam and reference beam and then selectively closing the beam shutters, one elemental hologram may be exposed to only red object and reference beams, another may be exposed to only green object and reference beams, and another may be exposed to only blue object and reference beams.

Polarization adjusting device 900 is located in the path of reference beam 25 so that it can adjust the polarization of the reference beam to compensate for the effects of film substrate birefringence. A variety of different devices can be used as polarization adjusting device 900. In one example, polarization adjusting device 900 includes a half-wave plate that introduces a 180° phase difference between two perpendicular components of the beam. Thus, by rotating the half-wave plate by an angle θ with respect to the polarization direction of the linearly polarized light entering the half-wave plate, the polarization angle of the light emerging from the half-wave plate is shifted by 2θ. Consequently, polarization adjusting device 900 can include additional optical components, such as linear polarizers. Other devices that can be used in polarization adjusting device 900 include: optical retarders (including liquid crystal variable retarders), wave plates of different orders, broadband polarization rotators, electro-optic modulators, acousto-optic modulators, magento-optic modulators, compensators, and rotatable polarization preserving optical fibers. In general, any device that allows the adjustment of a beam's polarization can be used as polarization adjusting device 900.

When polarization adjusting device 900 includes some form of transducer driven mount (e.g., for adjusting a half-wave plate), polarization adjusting device 900 is typically used in conjunction with controller 670. Controller 670 provides necessary control signals to polarization adjusting device 900 based on information about the dominant polarization direction of portions of holographic film substrate and the type of polarization adjusting device in use. In the example illustrated, controller 670 receives such information from computer 630, which can, for example, receive the necessary information directly from a film substrate birefringence analysis system, or via user input.

Figure 6:
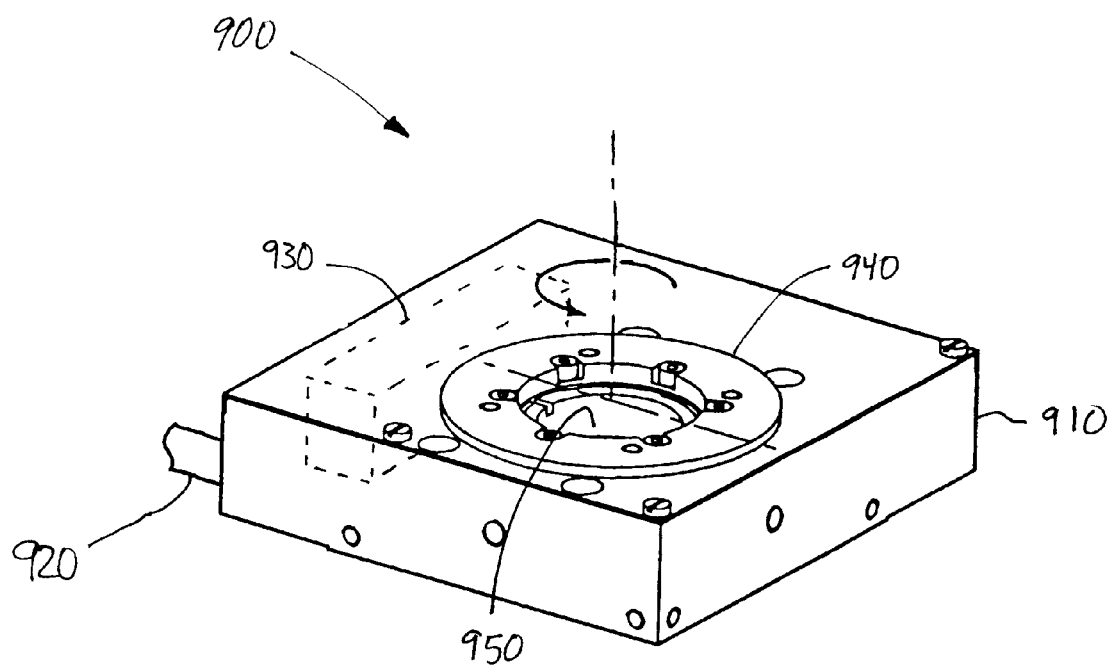
FIG. 6 illustrates one example of a polarization adjusting device and associated mount.

FIG. 6 illustrates one example of a polarization adjusting device 900 and associated mount. Mount 910 includes a motor 930 (e.g., a stepper motor or a DC servo motor) which is controlled and powered through cable 920. Rotation stage 940 holds half-wave plate 950, and when driven by motor 930, allows half-wave plate 950 to be rotated about a beam axis passing through the center point of half-wave plate 950. Drive systems used for rotation stages such as rotation stage 940 include worm gear systems where a gear wheel is concentric with the rotation stage, and a meshing screw (worm) is coupled to the gear wheel. As the screw is turned, threads meshing with the gear cause it to rotate. FIG. 6 illustrates one of the many different possible embodiments for polarization adjusting device 900.

Returning to FIG. 5, polarization adjusting device 900 is shown located in the path of reference beam 25. In general, polarization adjusting device 900 can be located in the path of either reference beams, object beams, or both. In the example illustrated, only reference beam 25 passes through the holographic film substrate before creating an interference pattern with object beam 20 in the holographic recording material layer. Consequently, only reference beam 25 is affected by the birefringence of the film substrate, and so polarization adjusting device 900 is used to "pre-adjust" the polarization of reference beam 25 so that it emerges from the holographic film substrate having the desired polarization. Similarly, polarization adjusting device 900 can be located in the object beam path, thereby adjusting the polarization of the object beam to match what will be the polarization of the reference beam after it passes through the holographic film substrate. Note also that the holographic film used, and the nature of the recording (e.g., original hologram recording versus hologram replication) can determine where polarization changing film substrates are located, and which beams require adjusting.

As shown, polarization adjusting device 900 is located close to material holder 850. In general, it is preferable to locate polarization adjusting device 900 as close to the holographic recording material layer as is possible or practical. This is because, every optical material that the adjusted beam passes through has the potential of further altering the adjusted beam's polarization. Locating polarization adjusting device 900 close to the holographic recording material layer reduces the number of intervening optical elements that the beam must pass through.

Those having ordinary skill in the art will readily recognize that a variety of different types of optical components can be used in place of the components discussed above. Moreover, the description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A system for adjusting the polarization of a recording laser beam comprising:
   a polarization adjusting device;
   a controller coupled to the polarization adjusting device and operable to control the polarization adjusting device according to information about a dominant polarization direction of a first portion of a holographic film substrate; and
   a computer coupled to the controller and including the information about the dominant polarization direction of the first portion of the holographic film substrate, the computer programmed to control the controller and provide the information about the dominant polarization direction of the first portion of the holographic film substrate to the controller.

2. The system of claim 1 wherein the polarization adjusting device further comprises:
   a retarder; and
   a polarizer.

3. The system of claim 2 wherein the polarizer is one of a linear, circular, and eliptical polarizer.

4. The system of claim 2 wherein the retarder is one of a wave plate, an acousto-optic moduator, an electro-optic modulator, a magneto-optic modulator and a compensator.

5. The system of claim 4 wherein the retarder is a half-wave plate.

6. The system of claim 1 wherein the polarization adjusting device includes a center point, a beam axis passing through the center point, the system further comprising:
   a mount supporting the polarization adjusting device for rotating the polarization adjusting device about the beam axis.

7. The system of claim 6 further comprising:
   a transducer coupled to the mount and responsive to the controller, the transducer operable to rotate the polarization adjusting device about the beam axis.

8. The system of claim 7 wherein the transducer is one of a stepper motor and a DC servo motor.

9. The system of claim 1 wherein the information about the dominant polarization direction of the first portion of the holographic film substrate is determined by analyzing the dominant polarization direction of a second portion of a holographic film substrate.

10. The system of claim 1 wherein the information about the dominant polarization direction of the first portion of the holographic film substrate includes a plurality of dominant polarization direction values.

11. The system of claim 1 further comprising:

a light source that produces a coherent beam;

a beam splitter that splits the coherent beam into an object beam and a reference beam;

a material holder for holding a holographic recording material;

an object beam unit for displaying a rendered image and for conditioning the object beam with the rendered image to interfere with the reference beam at a chosen elemental hologram location;

a reference beam steering system for directing the reference beam to interfere with the object beam at the chosen elemental hologram location; and a second computer programmed to control at least one of the interference of the object beam and the reference beam and the delivery of the rendered image to the object beam unit.

12. The system of claim 11 wherein the reference beam is the recording laser beam, and wherein the polarization adjusting device is located in the path of the reference beam.

13. The system of claim 11 wherein the object beam is the recording laser beam, and wherein the polarization adjusting device is located in the path of the object beam.

14. The system of claim 11 wherein the polarization adjusting device is located in close proximity to the material holder.

15. The system of claim 11 wherein the holographic recording material includes a photopolymer film and the holographic film substrate.

16. The system of claim 1 further comprising:

an assembly operable to position a hologram in proximity to a holographic recording material; and a beam steering unit operable to direct the recording laser beam at component portions of the hologram positioned by the assembly, the recording laser beam operable to replicate the component portions onto holographic recording material positioned by the assembly.

17. A method comprising:

measuring a first portion of a holographic film substrate to determine information about a dominant polarization direction of the first portion of the holographic film substrate;

adjusting the polarization of a recording laser beam based on the information about the dominant polarization direction of the first portion of the holographic film substrate.

18. The method of claim 17 further comprising:

providing a polarization adjusting device; and wherein the adjusting further comprises providing the information about the dominant polarization direction of the first portion of the holographic film substrate to a controller coupled to the polarization adjusting device.

19. The method of claim 17 wherein the measuring includes analyzing the first portion of a holographic film substrate between a first and a second linearly polarized material.

20. The method of claim 17 wherein the adjusting further comprises controlling one of a wave plate, an acousto-optic moduator, an electro-optic modulator, a magneto-optic modulator and a compensator based on the information about the dominant polarization direction of the first portion of the holographic film substrate.

* * * * *